US009424960B2

(12) United States Patent
Rikihisa et al.

(10) Patent No.: US 9,424,960 B2
(45) Date of Patent: Aug. 23, 2016

(54) AGGREGATED THREAD STRUCTURE, PRODUCTION METHOD THEREOF, AND ELECTRIC WIRE USING THE SAME

(71) Applicants: FURUKAWA ELECTRIC CO., LTD., Tokyo (JP); NATIONAL INSTITUTE OF ADVANCED INDUSTRIAL SCIENCE AND TECHNOLOGY, Tokyo (JP)

(72) Inventors: Hiroaki Rikihisa, Tokyo (JP); Masato Tachibana, Tokyo (JP); Michihiro Shimada, Tokyo (JP); Kinji Asaka, Osaka (JP); Ken Mukai, Osaka (JP); Takushi Sugino, Osaka (JP)

(73) Assignees: FURUKAWA ELECTRIC CO., LTD., Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 14/454,714

(22) Filed: Aug. 7, 2014

(65) Prior Publication Data

US 2014/0346697 A1 Nov. 27, 2014

Related U.S. Application Data

(60) Division of application No. 13/897,951, filed on May 20, 2013, now abandoned, which is a continuation of application No. PCT/JP2011/076817, filed on Nov. 21, 2011.

(30) Foreign Application Priority Data

Nov. 22, 2010 (JP) ................................. 2010-260469
Nov. 22, 2010 (JP) ................................. 2010-260476

(51) Int. Cl.
*H01B 1/24* (2006.01)
*D01F 9/12* (2006.01)
(Continued)

(52) U.S. Cl.
CPC . *H01B 1/24* (2013.01); *B82Y 30/00* (2013.01); *B82Y 40/00* (2013.01); *C01B 31/0253* (2013.01);
(Continued)

(58) Field of Classification Search
CPC .......................................................... H01B 1/24
USPC ...................................................... 423/447.1
See application file for complete search history.

(56) References Cited

U.S. PATENT DOCUMENTS

| | | | |
|---|---|---|---|
| 2007/0243124 A1* | 10/2007 | Baughman | B82Y 30/00 423/447.1 |
| 2008/0124507 A1 | 5/2008 | Poulin et al. | |
| 2008/0170982 A1* | 7/2008 | Zhang | B82Y 10/00 423/447.3 |

FOREIGN PATENT DOCUMENTS

| | | |
|---|---|---|
| JP | 2007535434 A | 12/2007 |
| WO | 2005108095 A2 | 11/2005 |
| WO | 2006137893 A2 | 12/2006 |

OTHER PUBLICATIONS

International Search Report mailed Feb. 28, 2014 in International Application No. PCT/JP2011/076817.

*Primary Examiner* — Daniel C McCracken
(74) *Attorney, Agent, or Firm* — Hauptman Ham, LLP

(57) ABSTRACT

A method for producing an aggregated thread structure includes (a) a process of dispersing carbon nanotube to a first solvent, which is water or a mixed solvent containing organic solvent and water, with a surfactant, to create a dispersion and (b) a process of injecting the dispersion, in which carbon nanotube is dispersed, to a condensing liquid, which is a second solvent that differs from the first solvent, to thereby aggregate and spin carbon nanotube. The aggregated thread structure containing carbon nanotube has: a bulk density of 0.5 g/cm³ or more; a weight reduction rate up to 450° C. of 50% or less; a G/D ratio for resonance Raman scattering measurement of 10 or more; and an electric conductivity of 50 S/cm or more.

8 Claims, 5 Drawing Sheets

(51) Int. Cl.
*D01D 10/06* (2006.01)
*C01B 31/02* (2006.01)
*D01D 5/06* (2006.01)
*B82Y 30/00* (2011.01)
*B82Y 40/00* (2011.01)
*H01B 1/04* (2006.01)

(52) U.S. Cl.
CPC ............ *C01B 31/0273* (2013.01); *D01D 5/06* (2013.01); *D01D 10/06* (2013.01); *D01F 9/12* (2013.01); *H01B 1/04* (2013.01); *C01B 2202/22* (2013.01); *C01B 2202/28* (2013.01); *D10B 2401/16* (2013.01); *Y10S 977/742* (2013.01); *Y10S 977/842* (2013.01); *Y10S 977/932* (2013.01); *Y10T 428/2918* (2015.01)

(a)

(b)

(c)

(a)

(b)

AGGREGATED THREAD STRUCTURE, PRODUCTION METHOD THEREOF, AND ELECTRIC WIRE USING THE SAME

RELATED APPLICATIONS

The present application is a divisional of Application Ser. No. 13/897,951, filed May 20, 2013, which is a continuation of International Application Number PCT/JP2011/076817, filed Nov. 21, 2011, and claims priority from, Japanese Application Number 2010-260476, filed Nov. 22, 2010, Japanese Application Number 2010-260469, filed Nov. 22, 2010. The each of the above listed applications is hereby incorporated by reference in its entirety.

TECHNICAL FIELD

The present invention relates to an aggregated thread structure of carbon nanotube, which is produced from carbon nanotube powder and does not contain resin, and a production method thereof, etc.

BACKGROUND ART

Carbon nanotube is a substance in which a graphene sheet made of carbon forms a monolayer- or multilayer-coaxial tube, and is a material that has ultrafine diameter, lightweight, high mechanical strength, high flexibility, high current density, high thermal conductivity, and high electric conductivity. By spinning such carbon nanotube into a thread, it is expected that a fibrous material with unprecedented properties can be obtained.

Such carbon nanotube spinning methods can be divided roughly into a gas phase method and a liquid phase method. A gas phase method is a method in which a spinning process directly follows the carbon nanotube synthesis process, thereby performing the synthesis and spinning of carbon nanotube simultaneously. On the other hand, the liquid phase method is a method in which a pre-synthesized carbon nanotube powder is dissolved in a liquid, and the dispersed carbon nanotube is spun to form a thread-like fibrous carbon nanotube. Thus, it is a method wherein synthesis and spinning are performed in separate processes.

As the gas phase method, for example, a method in which a catalyst for carbon nanotube synthesis and hydrocarbon that serves as a raw material for carbon nanotube are provided to a cylindrical reactor along with a carrier gas, thereby allowing carbon nanotube to grow, which is then spun onto a spindle in a non-reactive area of the reactor to obtain a carbon nanotube fiber, is disclosed (see Patent Document 1).

Further, as the liquid phase method, a method in which a carbon nanotube dispersion of low viscosity, wherein carbon nanotube is uniformly dispersed, is discharged into a viscous dispersion containing poly vinyl alcohol (PVA) etc. with a steady flow, to obtain a composite fiber of carbon nanotube and PVA, is disclosed (see Patent Document 2).

Furthermore, as another liquid phase method, a method in which a carbon nanotube dispersion of low viscosity, wherein carbon nanotube is uniformly dispersed, is discharged into a dispersion of strong acid or strong alkali (with pH 3 or less or pH 11 or more), to obtain a nanofiber, is disclosed (see Patent Document 3).

PRIOR ART DOCUMENTS

Patent Documents

Patent Document 1: JP-A-2007-535434
Patent Document 2: United States Patent Application 20080124507
Patent Document 3: United States Patent Application 20070243124

SUMMARY OF THE INVENTION

Technical Problem

However, in the method described in Patent Document 1, since synthesis and spinning of carbon nanotube are performed consecutively, there was a problem that it was difficult to optimize the rate of synthesis and the rate of spinning, due to the fact that they both had different optimal conditions with each other. Further, since synthesis and spinning of carbon nanotube are performed consecutively, there was also a problem in that it was impossible to perform steps such as removal of catalyst from the synthesized carbon nanotube, surface treatment of carbon nanotube, separation of metallic carbon nanotube and semi-conductive carbon nanotube, etc. In particular, since carbon nanotube is usually synthesized as a mixture of both metallic and semi-conductive materials, spinning without separating the two materials leads to the resulting fibrous material to exhibit a not outstanding electric conductivity.

Further, in the method described in Patent Document 2, since spinning of carbon nanotube is performed using resin such as PVA, a resin layer is created on the surface of the carbon nanotube, and the resin infiltrate into the carbon nanotube. The resin layer created on the surface increases the contact resistance between the carbon nanotubes, and reduces the conductivity of the composite wire. The resin that infiltrate reduces the electric conductivity of the carbon nanotube itself. Therefore, in the method of Patent Document 2, there is a problem in that a composite wire rod with excellent electric conductivity cannot be obtained.

Furthermore, in the method described in Patent Document 3, since a strong acid or strong alkali is used as a condensing liquid for the spinning of carbon nanotube, defects generate in the carbon nanotube. When defects generate, the graphite crystal of the carbon nanotube becomes damaged, leading to the deterioration of electric conductivity and mechanic properties of the carbon nanotube. Thus, there was a problem in that the electric conductivity and mechanic property of the acquired secondary nanofiber of the carbon nanotube also deteriorate.

Means for Solving the Problem

The present inventions were made in view of the aforementioned problems, and its purpose is to obtain an aggregated thread structure with high electric conductivity, by spinning of carbon nanotube.

In order to attain the above-described purpose, the following inventions are provided.
(1) An aggregated thread structure containing carbon nanotube, characterized in that: the bulk density is 0.5 g/cm$^3$ or more; the weight reduction rate, which is obtained by subtracting heated weight from dry weight, and dividing the result by the dry weight, wherein the dry weight is the weight measured after heating under air from room temperature to 100° C. at a temperature increase rate of 10°

C./min and letting stand at 100° C. for 10 minutes, and the heated weight is the weight measured after further heating under air to 450° C. at a temperature increase rate of 10° C./min, is 50% or less; the G/D ratio, in which G is the maximum peak intensity in the range of 1550 to 1650 cm$^{-1}$ and D is the maximum peak intensity in the range of 1300 to 1400 cm$^1$ for the spectrum obtained by resonance Raman scattering measurement, is 10 or more; and the electric conductivity is 50 S/cm or more.

(2) The aggregated thread structure of (1), wherein said weight reduction rate is 25% or less, and the G/D ratio for resonance Raman scattering measurement is 30 or more.

(3) The aggregated thread structure of (1), wherein said carbon nanotube contains a single-walled carbon nanotube, a double-walled carbon nanotube, or a multiwall carbon nanotube.

(4) The aggregated thread structure of (1), wherein the electric conductivity is 500 S/cm or more.

(5) The aggregated thread structure of (1), wherein: said aggregated thread structure has a diameter of 10 μm or more to 1 cm or less; the length/diameter ratio is 100 or more; said aggregated thread structure comprises a plurality of grooves in the longitudinal direction, with a depth of 1 to 3 μm and a length of 30 μm or more; and said aggregated thread structure comprises a plurality of voids of 100 nm or more to 10 μm or less.

(6) The aggregated thread structure of (1), wherein the weight composition ratio of carbon nanotube is 75% or more.

(7) An electric wire, which is characterized in that it uses the aggregated thread structure of (1) as a conductor.

(8) An aggregated thread structure containing carbon nanotube, characterized in that: the bulk density is 0.5 g/cm$^3$ or more; the G/D ratio, in which G is the maximum peak intensity in the range of 1550 to 1650 cm$^{-1}$ and D is the maximum peak intensity in the range of 1300 to 1400 cm$^{-1}$ for the spectrum obtained by resonance Raman scattering measurement, is 10 or more; and the electric conductivity is 500 S/cm or more.

(9) A method for producing an aggregated thread structure, which comprises: (a) a process of dispersing carbon nanotube to a first solvent, which is water or a mixed solvent containing organic solvent and water, with a surfactant, to create a dispersion; and (b) a process of injecting said dispersion of carbon nanotube to a condensing liquid, which is a second solvent differing from the first solvent, to thereby aggregate and spin carbon nanotube.

(10) The method for producing an aggregated thread structure of (9), wherein said first solvent is water or a mixed solvent of one or more organic solvent selected from the group consisting of methanol, ethanol, propanol, formamide, ethylene glycol, and dimethyl sulfoxide, and water.

(11) The method for producing an aggregated thread structure of (9), wherein said condensing liquid is a solution containing one of N-methylpyrrolidone, N,N-dimethyl acetamide, propylene carbonate, formamide, N-methyl formamide, water, methanol, ethanol, or propanol, and said condensing liquid and said first solvent differ in their affinity to said surfactant.

(12) The method for producing an aggregated thread structure of (11), wherein said condensing liquid contains N,N-dimethyl acetamide.

(13) The method for producing an aggregated thread structure of (9), wherein said surfactant is a surfactant selected from one or more type(s) selected from the following groups (A) to (C):

(A) a non-ionic surfactant with an HLB, calculated by the Griffin method, of 8 or more;

(B) an anionic surfactant: alkyl benzene sulfonate, alkyl alcohol sulfate salt, sodium alkyl diphenyl ether disulphonate, sodium polyoxyethylene alkyl ether sulfate, sodium diakyl sulfosuccinate, sodium alkyl aryl sulfosuccinate, n-lauroyl sarcosine sodium salt, sodium polyoxyethylene alkyl phenyl ether sulfate, sodium (meta)acryloyl polyoxyalkylene sulfate, alkyl alcohol phosphate;

(C) a cationic surfactant: tetra alkyl ammonium halide.

(14) The method for producing an aggregated thread structure of (13), wherein said surfactant is a combination of one or more surfactants selected from each of said group (A) and said group (B), or each of said group (A) and said group (C).

(15) The method for producing an aggregated thread structure of (13), wherein said surfactant comprises a plurality of surfactants with different lengths of main chain.

(16) The method for producing an aggregated thread structure of (13), wherein said surfactant comprises sodium dodecyl sulfate.

(17) The method for producing an aggregated thread structure of (9), wherein the pH of said condensing liquid is 3 to 11.

(18) The method for producing an aggregated thread structure of (9), which further comprises: a process of extracting said aggregated thread structure from said condensing liquid and immersing in a solvent; a process of drying said aggregated thread structure; and a process of stretching said aggregated thread structure; following said process (b).

(19) The method for producing an aggregated thread structure of (18), which further comprises a process of twisting said aggregated thread structure.

(20) The method for producing an aggregated thread structure of (9), wherein said carbon nanotube is one that has been treated for catalyst removal.

(21) An aggregated thread structure, which is produced by the production method of (9).

(22) An aggregated thread structure, which is produced by the production method of (9), characterized in that: the bulk density is 0.5 g/cm$^3$ or more; the weight reduction rate, which is obtained by subtracting heated weight from dry weight, and dividing the result by the dry weight, wherein the dry weight is the weight measured after heating under air from room temperature to 100° C. at a temperature increase rate of 10° C./min and letting stand at 100° C. for 10 minutes, and the heated weight is the weight measured after further heating under air to 450° C. at a temperature increase rate of 10° C./min, is 50% or less; and the G/D ratio, in which G is the maximum peak intensity in the range of 1550 to 1650 cm$^{-1}$ and D is the maximum peak intensity in the range of 1300 to 1400 cm$^{-1}$ for the spectrum obtained by resonance Raman scattering measurement, is 10 or more.

Effect of the Invention

According to the present invention, an aggregated thread structure with high electric conductivity can be obtained by spinning carbon nanotube.

Figure 1:
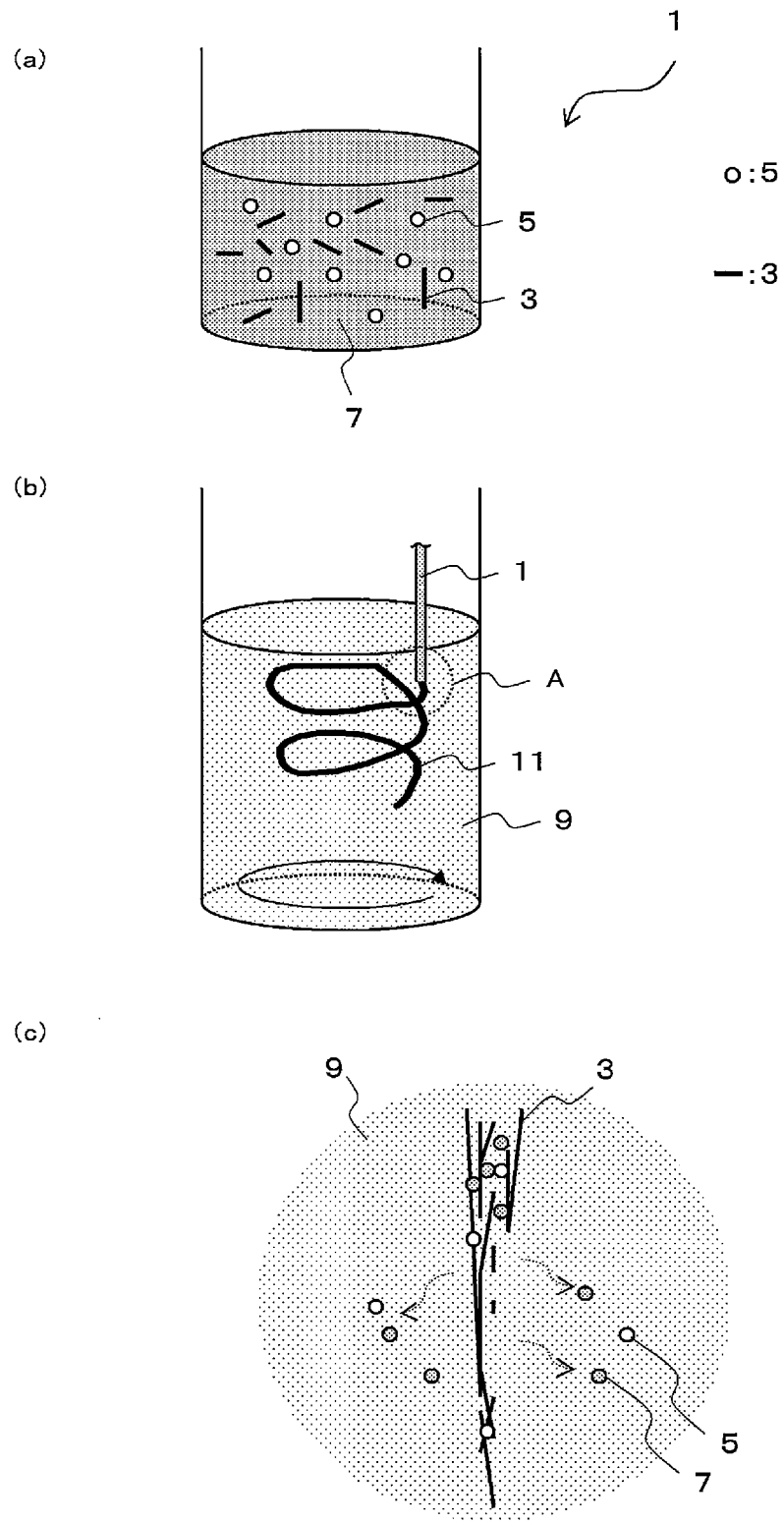
FIG. 1: (a) a figure that illustrates the preparation process of the dispersion in the production method of the aggregated thread structure of the present invention; (b) a figure that illustrates the spinning process; and (c) a magnified view of part A in (b).

BEST MODE FOR CARRYING OUT THE INVENTION (Aggregated Thread Structure of the Present Invention)

Hereinafter, embodiments of the present invention will be described in detail with reference to the drawings.

First, the aggregated thread structure of the present invention is formed by spinning a multitude of carbon nanotubes.

The bulk density of the aggregated thread structure of the present invention is 0.5 g/cm$^3$ or more. Such bulk density may be calculated by various known methods. In particular, the method in which the volume of the aggregated thread structure is calculated assuming it to be of a cylindrical shape, by measuring the weight, diameter, and length of the aggregated thread structure, and dividing the dry weight by said volume, is preferred. Note that the bulk density of a single-walled carbon nanotube prior to spinning is around 0.2 to 0.3 g/cm$^3$. Fibers of carbon nanotube produced by the gas phase method also have a bulk density of 0.2 to 0.3 g/cm$^3$. That is, the aggregated thread structure of the present invention excels in electric conductivity and mechanical strength than the spun carbon nanotube produced by the gas phase method, since carbon nanotube is spun more densely.

In the aggregated thread structure of the present invention the weight reduction rate, which is obtained by subtracting heated weight from dry weight, and dividing the result by the dry weight, wherein the dry weight is the weight measured after heating under air from room temperature to 100° C. at a temperature increase rate of 10° C./min and letting stand at 100° C. for 10 minutes, and the heated weight is the weight measured after further heating under air to 450° C. at a temperature increase rate of 10° C./min, is 65% or less. Note that it is more preferable that such weight reduction rate is 50% or less, and further preferable that it is 25% or less. The smaller the weight reduction rate, the less organic substances (especially resin) other than carbon nanotube exist in the aggregated threat structure, leading to improved electric conductivity and heat resistance.

The aggregated thread structure of the present invention preferably has an electric conductivity of 50 S/cm or more. More preferably, its electric conductivity is 100 S/cm or more, and further preferably, 200 S/cm or more. Still further preferably, the electric conductivity is 500 S/cm or more. The electric conductivity of a general conductive polymer is less than 50 S/cm. Thus, the aggregated thread structure of the present invention, which has an electric conductivity of 50 S/cm or more, can be applied to various uses. Furthermore, the higher the electric conductivity, the more it is useful, and is thus preferable.

The aggregated thread structure of the present invention comprises a plurality of grooves with a depth of 1 to 3 µm and a length of 30 µm or more in the longitudinal direction on its surface. Observed from its cross-section, the aggregated thread structure comprises a plurality of voids of 100 nm or more to 10 µm or less. Such grooves and voids on the longitudinal direction are thought to be generated after the aggregated thread structure is pulled out of the dispersion and condensing liquid, and dried of solvents.

The aggregated thread structure of the present invention has a diameter of 10 µm or more, preferably 30 µm or more and 1 cm or less. The length/diameter ratio is preferably 100 or more.

In the spectrum obtained by irradiating laser (for example, Ar laser of 514 nm) to the aggregated thread structure of the present invention to measure its resonance Raman scattering, the G/D ratio is 10 or more, and more preferably 30 or more. Here, G is the maximum peak intensity in the range of 1550 to 1650 cm$^{-1}$ and D is the maximum peak intensity in the range of 1300 to 1400 cm$^{-1}$. The peak in the range of 1550 to 1650 cm$^{-1}$ is called the G band, and is a peak originating from the graphite structure of carbon nanotube. The peak in the range of 1300 to 1400 cm$^{-1}$ is called the D band, and is a peak originating from amorphous carbon and lattice defects of carbon nanotube. The value of G/D ratio being 10 or more means that the material is constructed of high-quality carbon nanotube with few lattice defects. In particular, if the value is 30 or more, the material is constructed of even more high-quality carbon nanotube, and excels in thermal conductivity, electric conductivity, and heat resistance.

The aggregated thread structure of the present invention preferably contains 75 wt % or more of carbon nanotube.

(Carbon Nanotube)

As the carbon nanotube comprising the aggregated thread structure of the present invention, its type is not particularly limited, and carbon nanotubes produced by various publicly known processes can be used. Specifically, carbon nanotubes synthesized by the high-pressure carbon monoxide (HiPco) method, the laser abrasion method, the arc discharge method, the chemical vapor deposition (CVD) method, etc. can be listed. The carbon nanotube may constitute single-walled carbon nanotubes only, double-walled carbon nanotubes only, multi-walled carbon nanotubes only, or may be their mixture. It is preferable that the carbon nanotube consist of metallic single-walled carbon nanotubes alone, from which catalyst has been removed.

Since a carbon nanotube is usually synthesized using catalysts of metal particles such as iron, nickel, and cobalt, carbon nanotube powders often contain catalysts. When catalyst is included in carbon nanotube powders, deterioration of electric conductivity and decrease of heat-resistance can be triggered. Therefore, it is preferred that the catalyst be removed by treating the carbon nanotube with acid, prior to spinning.

As for the carbon nanotube, it is preferred that its average diameter is 0.5 to 100 nm. The average diameter is preferably obtained by averaging the actual value of the diameter measured by an electron microscope. The carbon nanotube may be linear, or curved.

The arc discharge method is a method in which arc discharge is performed under argon or hydrogen slightly lower than atmospheric pressure, between two electrodes made of carbon rods. Multi-walled carbon nanotubes are deposited on the cathode, and collected. Further, single-walled carbon nanotubes can be obtained from the soot adhered on the inner surface of the treatment vessel, when arc discharge is performed using carbon rods mixed with catalysts of nickel/cobalt.

The laser abrasion method is a method in which strong pulse laser of YAG laser is irradiated on the surface of a target (carbon mixed with a catalyst such as nickel/cobalt) under noble gas (for example, argon). The carbon surface is melted and evaporated, and single-walled carbon nanotube is obtained.

The vapor deposition method is a method in which hydrocarbons such as benzene and toluene undergo thermal decomposition under vapor phase, to thereby synthesize carbon nanotube. More specifically, the flow catalyst method and the zeolite-supported catalyst method, etc. may be exemplified.

The high-pressure carbon monoxide (HiPco) method is a type of vapor deposition method, which uses an iron compound as the catalyst to carry out thermal decomposition of carbon monoxide at high pressure, to thereby obtain single-walled carbon nanotube of a comparatively small diameter (about 1 nm) in high purity.

Further, it is preferable that the carbon nanotube contains carbon nanotube with ballistic conductivity. Ballistic conductivity is realized when the size of the carbon nanotube is larger than the mean free path of the electron and smaller than the total phase length. In a carbon nanotube that shows ballistic conductivity, improvement in electric conductivity based on non-scattering of the carrier can be expected.

The carbon nanotube may also contain doped carbon nanotube. Doping refers to accommodating a dopant in the interior space of the carbon nanotube, or covering carbon nanotube with a dopant. Favorable dopants are alkaline metals, halogens, conductive polymers ($PPyCF_3SO_3$, PPyTFSI), ionic liquids ($EMIBF_4$, EMITFSI), organic molecules (TCNQ (Tetracyanoquinodimethane), DNBN-3,5-Dinitro benzonitrile, F4-TCNQ (Tetrafluorotetracyanoquinodimethane), TDAE (Tetrakis(dimethylamino)ethylene), TTF (Tetrathiafulvalene), TMTSF (Tetramethyl tetraselenafulvalene), LiTFSI (Lithium bis(trifluoromethane sulfone)imide), etc.

Further, it is preferred that the carbon nanotube contains carbon nanotube given with nano-particles of metal such as copper, nickel, titanium, and magnesium. "With nano-particles" refers to the state in which metal particles are adhered on to the surface of carbon nanotube.

Further, when single-walled carbon nanotube is synthesized, usually, those of metallic and semi-conductive properties are produced at a ratio of about 1:2. Therefore, it is preferred that the metallic single-walled carbon nanotubes and the semi-conductive single-walled carbon nanotubes are separated by ion chromatography etc. and that only those of metallic properties are used in spinning.

As for the property of the carbon nanotube used in the present invention, the G/D ratio for the aforementioned Raman spectrum is preferably 10 or more, and more preferably, 30 or more. When the G/D ratio is 10 or more, it means that the carbon nanotube is of high quality with few lattice defects. In particular, when the ratio is 30 or more, the carbon nanotube is of even higher quality and excels in thermal conductivity, electric conductivity, and heat resistance.

Furthermore, as for the property of the carbon nanotube, it is preferred that thermal decomposition does not occur until about 800° C., and that weight reduction between 100° C. to 800° C. is 50% or less, more preferably, 25% or less. The weight reduction of carbon nanotube between 100° C. to 800° C. results from the amount of amorphous carbon. Carbon nanotube with less amorphous carbon is of higher quality, and is excellent in thermal conductivity, electric conductivity, and heat resistance.

(Effect of the Aggregated Thread Structure)

Since the aggregated thread structure of the present invention does not contain resin in its interior, and is not treated with strong acid or strong alkali and defects do not occur, aggregated thread structures of high electric conductivity can be obtained. Further, by using only metallic single-walled carbon nanotube from which catalysts have been removed, aggregated thread structures of higher electric conductivity can be obtained.

Furthermore, since the aggregated thread structure of the present invention does not have defects resulting from treatment by strong acids and strong alkali, aggregated thread structures with higher mechanical strength than aggregated thread structures obtained by conventional methods can be obtained.

Moreover, since the aggregated thread structure of the present invention has a wrinkled structure with grooves on the surface, it has excellent workability and sliding properties.

By twisting these aggregated thread structures in to a desired size to form a conductor and coating an insulator on the outside, as needed, an electric wire can be obtained. Since such an electric wire has a high electric conductivity, high thermal conductivity, and high thermal stability, an electric wire that is lightweight and that can send large current, can be realized.

(Method for Producing Aggregated Thread Structure)

FIG. 1 is a diagram that describes the production method of the aggregated thread structure according to one embodiment of the present invention. First, as shown in FIG. 1(a), carbon nanotube 3, synthesized by various methods, is dispersed into a first solvent 7 along with a surfactant 5, to prepare dispersion 1.

Subsequently, as shown in FIG. 1(b), dispersion 1 is continuously injected to a condensing liquid 9, using a syringe etc. while stirring. FIG. 1(c) is a magnified view of part A in FIG. 1(b). As shown in FIG. 1(c), from the dispersion injected into the condensing liquid 9, surfactant 5 and the first solvent 7 are dispersed in the condensing liquid 9, carbon nanotube 3 is spun, and the aggregated thread structure 11 is obtained.

The present invention is characteristic in the point that an aggregated thread structure is obtained by "continuously injecting a dispersion into a condensing liquid". For example, if the condensing liquid is inserted into a syringe etc. and injected into a dispersion containing a carbon nanotube, an aggregate of unstructured form or membrane-like form may be acquired, but an aggregated thread structure cannot be obtained. Further, if the condensing liquid is put into a beaker etc. and the condensing liquid is poured into the dispersion, an aggregate of infinite form or membrane-like form may be acquired, but an aggregated thread structure cannot be obtained.

Furthermore, following the above process, other processes, such as a process of immersing the aggregated thread structure 11 of carbon nanotube 3 in water and drying, and a process of stretching the aggregated thread structure, may also be included. In the stretching process, the orientation of the carbon nanotube improves by mechanically stretching 50% or more of the breaking strain. Further, a process of twisting a plurality of aggregated thread structures 11, i.e., the process of twining to entangle and form one thick wire rod, may also be included.

As for the carbon nanotube 3, the carbon nanotubes that can be applied to the aforementioned aggregated thread structure.

(Surfactant)

As for the surfactant 5, the following (1) to (3) are exemplified. It is preferable that at least one type of surfactant selected from groups (1) to (3) is used. Alternatively, at least one type of surfactant selected from each of groups (1) and (2) or (1) and (3) may be used in combination.

(1) a non-ionic surfactant with an HLB of 8 or more;
(2) an anionic surfactant: alkyl benzene sulfonate (for example, sodium dodecyl benzene sulfonate etc.), alkyl alcohol sulfate salt (for example, sodium dodecyl sulfate), sodium alkyl diphenyl ether disulphonate, sodium polyoxyethylene alkyl ether sulfate, sodium diakyl sulfosuccinate, sodium alkyl aryl sulfosuccinate, n-lauroyl sarcosine sodium salt, sodium polyoxyethylene alkyl phenyl ether sulfate, sodium (meta)acryloyl polyoxyalkylene sulfate, alkyl alcohol phosphate, etc.;
(3) a cationic surfactant: tetra alkyl ammonium halide, etc.

If the HLB of the non-ionic surfactant is 8 or more, it is easily dispersed or dissolved in water, and thus, water can be used as the first solvent 7 for the dispersion
1. Note that the HLB of the non-ionic surfactant is obtained by the Griffin method.

The Griffin method defines HLB by the following equation: HLB value=20 ×(total sum of the hydrophilic part/molecular weight). Further, the Davis method defines HLB by determining a cardinal number according to the functional group, and applying it to the following equation: HLB value=7 +(total sum of the cardinal number for the hydrophilic group−total sum of the cardinal number of the lipophilic group).

The non-ionic surfactant of (1) is not limited in particular, as long as the HLB is 8 or more. For example, surfactants such as polyoxyethylene alkyl ether, polyoxyethylene alkyl phenyl ether, sorbitan fatty acid ester, polyoxyethylene sorbitan fatty acid ester, glycerin fatty acid ester, and polyoxyethylene fatty acid ester, with HLB of 8 or more, are listed. In particular, surfactants with HLB of 8 or more, among poly(oxyethylene) octyl phenyl ethers (for example, Triton (registered trademark) X-100), and polyoxy ethylene sorbitan monolaurates (for example, Tween (registered trademark) 20) etc., are listed.

Furthermore, it is also preferable to use the dispersion 1 after heating to a temperature higher than room temperature. By heating, the functionality of the surfactant becomes higher, and thus, the amount of the surfactant to be added can be reduced. If the amount of the surfactant to be added can be reduced, the amount of surfactant that may get mixed into the aggregated thread structure can be reduced, and the conductivity of the aggregated thread structure can be enhanced. Further, dispersions that use surfactants that cannot successfully spin thread under room temperature, may successfully spin thread by heating.

Although it is also possible to use a plurality of surfactants of the above-mentioned (1) to (3), when anionic surfactants of (2) and cationic surfactants of (3) both exist, the anionic surfactant and the cationic surfactant aggregate, and cease to function as surfactants. Hence, it is preferred that anionic surfactants and cationic surfactants are not mixed together. In other words, when using two or more surfactants, it is preferred that a plurality of the same type of surfactants with non-ionic, anionic, or cationic properties are used, or that a combination of non-ionic surfactants and anionic surfactants, or a combination of non-ionic surfactants and cationic surfactants, are used.

Furthermore, at times, it may be also preferred that a plurality of surfactants with different length of main chains are included. More specifically, a plurality of surfactants containing the same functional groups but with alkyl chains of different lengths may be added. In reality, the carbon nanotubes used are not only those that are dispersed as single carbon nanotubes. Some may be aggregated to form clusters of a plurality of carbon nanotubes. In such a case, surfactants with shorter-length main chains are preferable for carbon nanotubes that are singularly dispersed, since they are easier to remove from the carbon nanotube during spinning, and the amount of surfactants incorporated into the aggregated thread structure decreases. Further, for the carbon nanotube in which a plurality are aggregated to form a cluster, surfactants with longer-length main chains are more preferable, since they are less likely to be incorporated into the cluster during dispersion. Thus, since the carbon nanotube used in reality contains carbon nanotubes that are singularly dispersed and carbon nanotubes that are aggregated to form a cluster, it is preferred that a plurality of surfactants with different lengths of main chains are added.

(The First Solvent)

The first solvent 7, used for the dispersion 1, is either water or a mixed solvent of water and an organic solvent. As such organic solvent, methanol, ethanol, propanol, formamide, ethylene glycol, and dimethylsulfoxide can be listed.

The dispersion 1 contains carbon nanotube 3 in a concentration of 0.1 wt % to 1.5 wt %, preferably 0.2 wt % to 0.4 wt %, and contains surfactant 5 in a concentration of 0.1 wt % to 2.0 wt %, preferably 0.6 wt % to 1.2 wt %.

As for the pH of the dispersion 1, it is preferably 3 to 11. This range is set because exposing carbon nanotube to a solution of strong acid or strong alkali causes defects in the graphite crystal of the carbon nanotube, and lead to the deterioration of the electric conductivity and mechanical property of the carbon nanotube itself.

(The Second Solvent)

As the second solvent (condensing liquid) 9, a solution containing one of N-methylpyrrolidone, N,N-dimethyl acetamide, propylene carbonate, formamide, N-methyl formamide, water, methanol, ethanol, or propanol is preferable, and a solution containing at least N,N-dimethyl acetamide is more preferable. Note that the second solvent 9 differs from the first solvent 7. Further, the condensing liquid 9 and the first solvent 7, differ in their affinity to surfactant 5. Hence, the affinity toward the assembly of carbon nanotube and the surfactant differ between the dispersion and the condensing liquid. In the dispersion, it is necessary that the assembly of carbon nanotube and surfactant disperse well, while in the condensing liquid, the assembly of carbon nanotube and surfactant must aggregate.

Favorable embodiments of the present invention have hitherto been described with reference to the accompanying figures. However, the present invention is not limited to such examples. It should be understood by those in the field that examples of various changes and modifications are included within the technical idea of the present invention, and that such examples should be included within the technical scope of the present invention.

EXAMPLE

Hereafter, the present invention will be described more specifically using Examples and Comparative Examples.

Example 1

(Preparation of Dispersion)

First, 40 mg of single-walled carbon nanotubes (FH-P by Meijo Nano Carbon Co. Ltd.) and 120 mg of sodium dodecyl sulfate (anionic surfactant, HLB value=40 (Davis method)) are added to 9840 mg of water, stirred at 700 rpm for 2 hours, and dispersed using an ultrasonic homogenizer (US-50 by Nihon Seiki Kaisha, Ltd.) for 5 minutes.

Figure 2:
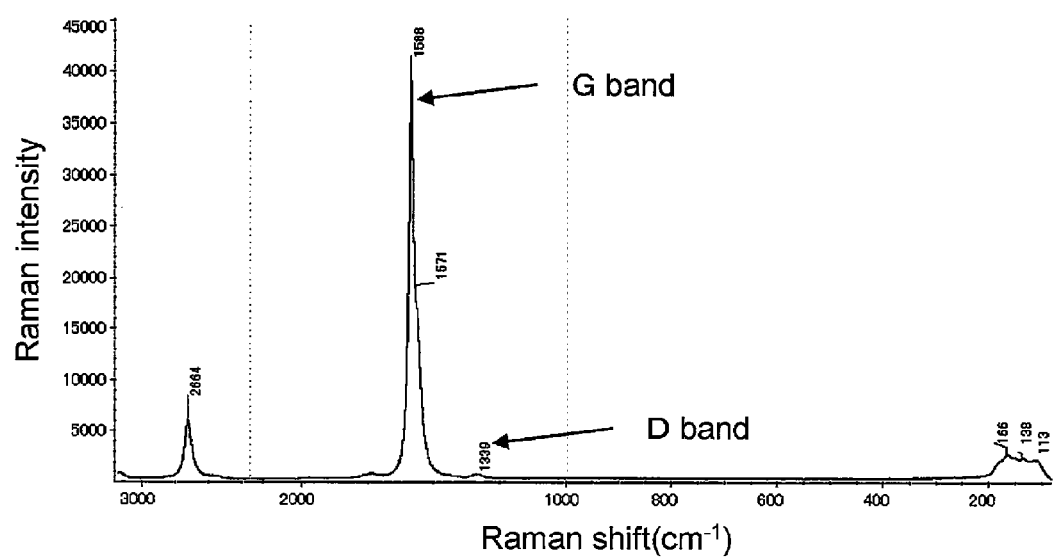
FIG. 2: a figure illustrating the Raman spectrum of the single-walled carbon nanotube (FH-P) used in Example 1.

The Raman spectrum of FH-P is shown in FIG. 2. The G/D ratio, or the ratio between the intensity of the G band (1588 cm$^{-1}$) and the D band (1339 cm$^{-1}$), for FH-P was 38.9.

(Injection and Spinning Process)

The dispersion was introduced into a syringe. Using N,N-dimethyl acetamide as the condensing liquid, the tip of the syringe was dipped into the condensing liquid, and the dispersion was gently injected to the condensing liquid, thereby spinning carbon nanotube. The injection conditions of the dispersion to the condensing liquid was as follows: injection nozzle diameter was 0.51 mm, the distance of the injection nozzle from the center of the condensing liquid was set to about 3 cm, the injection speed was about 1.9 ml/min, and the rotational speed of the stirring bar in the condensing liquid was set to 50 rpm.

Figure 3:
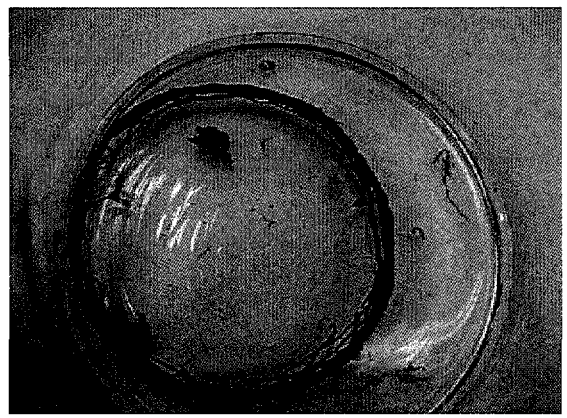
FIG. 3: (a) a figure illustrating the aggregated thread structure immediately after injecting the dispersion into the condensing liquid, in Example 1; (b) a figure illustrating the aggregated thread structure after pulling out of water, in Example 1; (c) a figure illustrating the aggregated thread structure after drying.
Figure 3:
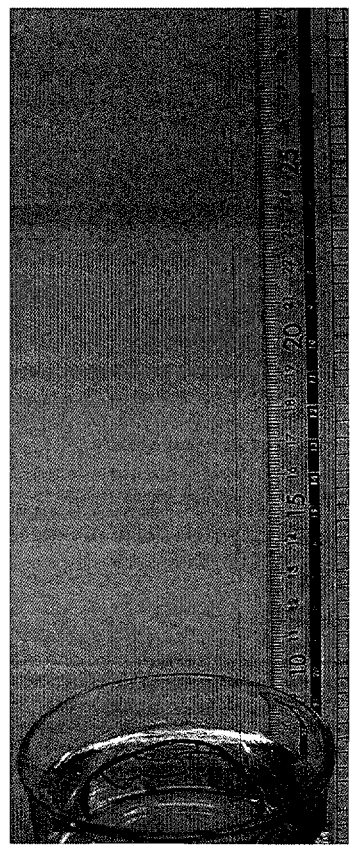
Figure 3:
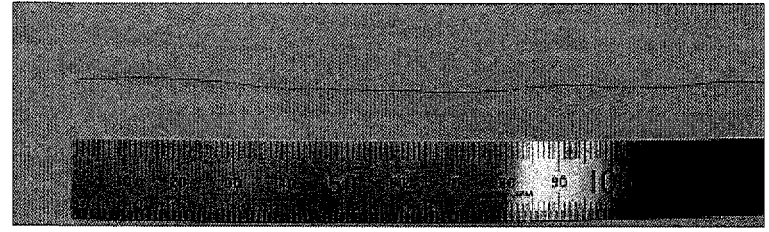

The aggregated thread structure after injecting the dispersion into the condensing liquid is shown in FIG. 3(a).

Then, the aggregated thread structure was immersed in water for one day, and vacuum dried for one day.

The state of the aggregated thread structure when pulled up from water is shown in FIG. 3(b), and the aggregated thread structure after drying is shown in FIG. 3(c).

(Investigation of Injection Conditions)

The conditions of injecting the dispersion to the condensing liquid had an influence on the form of the aggregated thread structure. In particular, the total amount of the condensing liquid in relation to the total amount of the dispersion influenced the form of the aggregated thread structure. For example, when the total amount of the condensing liquid was 2 times and 4 times (less than 5 times) the total amount of the dispersion in the syringe, and the other conditions were set to those of Example 1, and the dispersion was gently injected to the condensing liquid, an aggregated thread structure was not obtained.

On the other hand, when the total amount of the condensing liquid was 6 times and 10 times (more than 5 times) the total amount of the dispersion in the syringe, and the other conditions were set to those of Example 1, and the dispersion was gently injected to the condensing liquid, aggregated thread structures were obtained for both conditions. Thus, it is desirable for the proportion of the amount of condensing liquid in relation to the total amount of dispersion to be larger, and more desirable to be more than 10 times. There is no upper limit to the proportion.

(Evaluation)

The electric conductivity of the aggregated thread structure of Example 1 was measured using the four-terminal method at 20° C. The electric conductivity of the aggregated thread structure of Example 1 was 1275.6 S/cm.

Further, for the aggregated thread structure of Example 1, the length was measured, the weight was measured using a weighing scale, and the diameter was measured by scanning electron microscope. Assuming its shape to be cylindrical, the bulk density of the aggregated thread structure of Example 1 was calculated to be 0.74 g/cm$^3$.

Furthermore, when thermogravimetric analysis was conducted under air at a temperature increase rate of 10° C./min, the weight reduction rate of the aggregated thread structure of Example 1 was 22.7% from 100 to 450° C. The G/D ratio of the Raman spectrum for the aggregated thread structure of Example 1 was 13.1.

Figure 4:
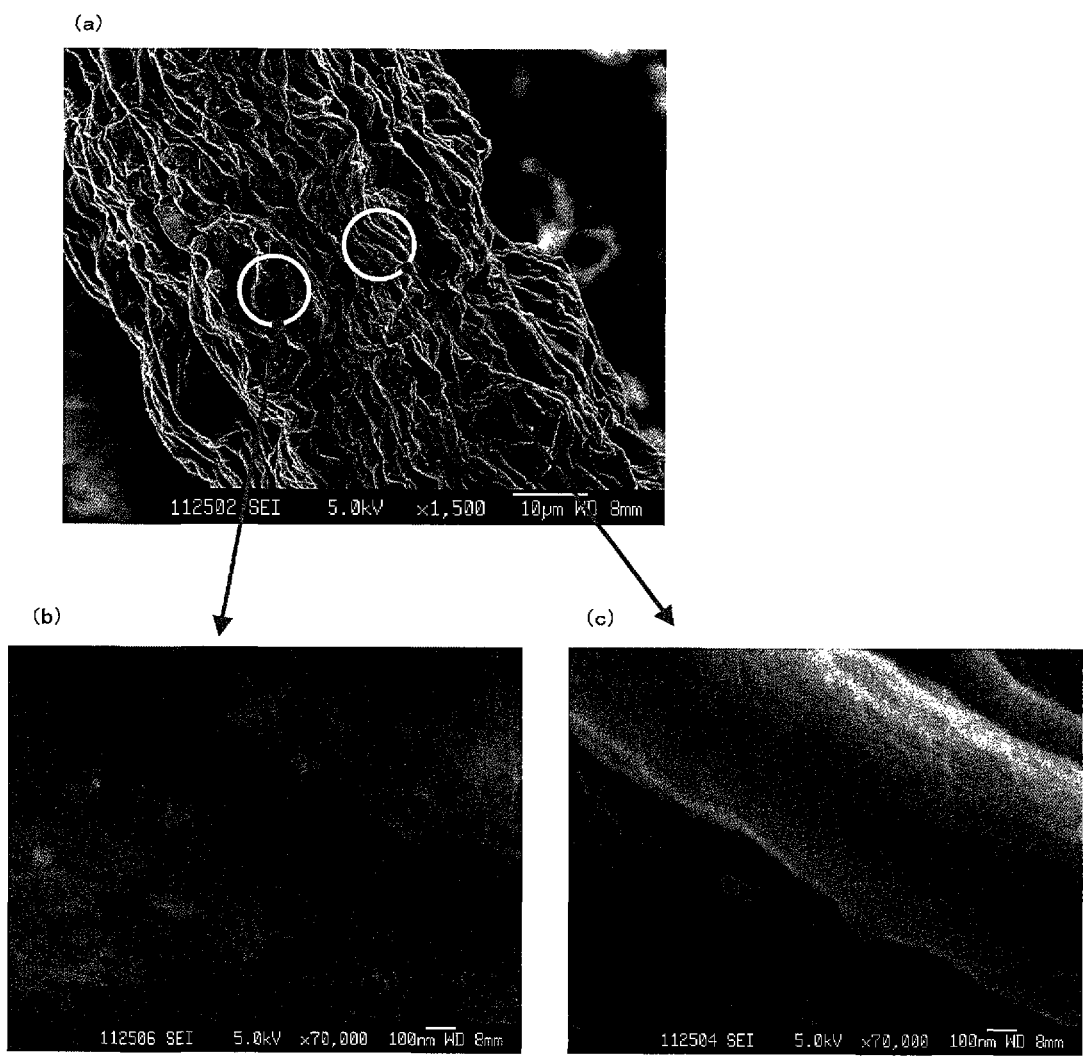
FIG. 4: (a) a photograph obtained during scanning electron microscope observation of the surface of the aggregated thread structure of Example 1; (b) a magnified view of the corresponding section in (b); (c) a magnified view of the corresponding section in (a).

The photograph obtained by observing the surface of the aggregated thread structure of Example 1 through scanning electron microscope is shown in FIG. 4(a) to (c). As shown in FIG. 4(a), countless grooves were formed on the surface of the aggregated thread structure along the longitudinal direction. These grooves had depths of 1 to 3 µm, and lengths of 30 µm or more. Further, from FIGS. 4(b) and (c), it can be seen that countless white lines of carbon nanotube run on the surface, indicating that the aggregated thread structure of Example 1 is a spun thread of a multitude of carbon nanotubes.

Figure 5:
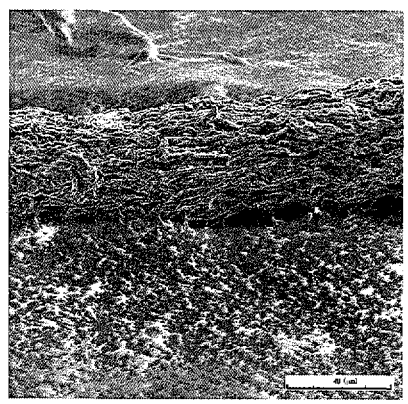
FIG. 5: a photograph obtained during observation of the aggregated thread structure of Example 1, prior to FIB treatment; (b) a photograph of the aggregated thread structure with the vertical section exposed after FIB treatment.
Figure 5:
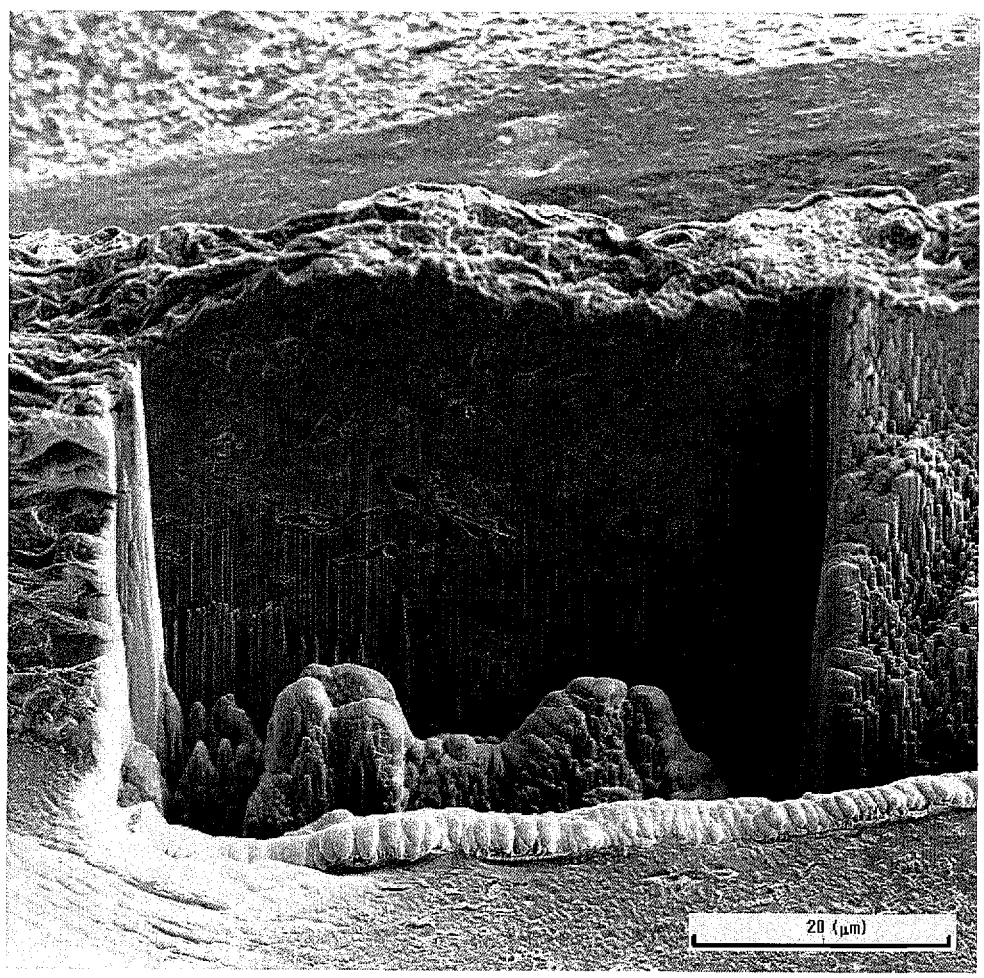

Further, part of the aggregated thread structure of Example 1 was subjected to focused ion beam (FIB) treatment, and its vertical section was observed by scanning electron microscope. FIG. 5(a) shows the photograph observing the aggregated thread structure prior to FIB treatment, and FIG. 5(b) shows the photograph in which the vertical section was exposed by FIB treatment. FIG. 5(b) shows that the aggregated thread structure has a plurality of voids of 100 nm or more to 10 µm or less on the interior of the aggregated thread structure.

Examples 2 to 43, Comparative Examples 1 to 6

The conditions of Example 1 were changed in terms of water immersion time, ultrasound conditions, stirring conditions, carbon nanotube content, type of carbon nanotube, ultrasonic dispersion time, dispersion solvent (first solvent), type of surfactant, and type of condensing liquid (second solvent), to prepare aggregated thread structures of Examples 2 to 43 and Comparative Examples 1 to 6, and their electric conductivities were measured.

In Examples 2 to 6, changes were made in the water immersion time and ultrasound time.

In Examples 7 to 10, the process of preparing the dispersion was performed using an ultrasonic stirrer, instead of the regular stirrer in Example 1.

In Examples 11 to 14, the carbon nanotube content, as well as the apparatus and conditions for ultrasonic dispersion, were changed.

In Examples 15 to 17, the ratio of carbon nanotube and surfactant was changed, as well as the apparatus and conditions for ultrasonic dispersion.

In Examples 18 to 20, the types of carbon nanotube used were changed.

In Examples 21 to 23, the first solvent used for the dispersion was changed to a mixed solvent of organic solvent added to water.

In Examples 24 to 26, the surfactant used in the dispersion was changed to Triton X-100, and the second solvent used as the condensing liquid was changed.

In Examples 27 to 29, the surfactant used in the dispersion was changed to Tween 20, and the second solvent used as the condensing liquid was changed.

In Examples 30 to 34, the surfactant used in the dispersion was changed to hard-type or soft-type sodium dodecylbenzenesulfonate, and the second solvent used as the condensing liquid was changed.

In Example 35, the dispersion process of Example 1 for the preparation of the dispersion was changed.

In Examples 35 to 39, the length of the alkyl chain in the surfactant used in the dispersion was changed from sodium dodecyl sulfate (12 carbons) alone of Example 35, to a mixture of sodium octyl sulfate (8 carbons) and sodium dodecyl sulfate. Further, Example 38 is an example in which the amount of sodium dodecyl sulfate was changed from that of Example 35. Example 39 is an example in which the amount of the surfactant is decreased while changing to a mixture of sodium octyl sulfate and sodium dodecyl sulfate. Note that as shown in the later-described Comparative Example 5, when sodium octyl sulfate was used on its own as a surfactant, thread could not be spun.

Examples 40, 41 and Comparative Examples 1, 2 are examples in which sodium hexadecyl sulfate (16 carbons) and sodium octadecyl sulfate (18 carbons) were used. When surfactant of long alkyl-chain lengths such as sodium hexadecyl sulfate and sodium octadecyl sulfate were used, spinning did not proceed successfully at room temperature, but succeeded under heating.

Example 42 is an example in which the period of water immersion of Example 41 was extended from one day to seven days. When sodium octadecyl sulfate was used as the surfactant, the electric conductivity increased as a result of extending the period of water immersion.

Example 43 and Comparative Examples 3, 4, and 6 are examples in which the amount of surfactant was reduced to 60 mg. In Example 43, in which sodium octadecyl sulfate with 18 carbons was used as the surfactant, spinning of thread was possible, even with the amount of surfactant reduced. However, when sodium hexadecyl sulfate with 16 carbons was used in Comparative Example 3, when sodium dodecyl sulfate with 12 carbons was used in Comparative Example 4, and when sodium octyl sulfate with 8 carbons was used in Comparative Example 6, spinning did not proceed successfully. Also, when sodium octyl sulfate was used as in Comparative Example 5, spinning did not proceed even with 120 mg of surfactants.

The results are summarized in the Tables.

The apparatus and materials used in the Examples are as follows.

Stirring Apparatus A: Ultrasound Homogenizer US-50 by Nihon Seiki Kaisha, Ltd.
Stirring Apparatus B: Ultrasound Stirrer USS-1 by Nihon Seiki Kaisha, Ltd.
Stirring Apparatus C: Ultrasound Homogenizer NR-50M by Microtec Co., Ltd.
SN2102: SN2102 single-walled carbon nanotube by Sun Innovation Inc.
SG-SWNTs: Single-walled carbon nanotube manufactured by the National Institute of Advanced Industrial Science and Technology by the Super-Growth method.
Hipco-CNT: Single-walled carbon nanotube manufactured by Unidym using the HiPco method (Purified quality with ash content of 5 to 15 wt %)
Triton X-100: Triton X-100 by Kishida Chemical Co., Ltd., poly(oxyethylene) octyl phenyl ether (non-ionic surfactant, HLB value=13.4)
Tween20: Tween 20 by Kishida Chemical Co., Ltd., polyoxy ethylene sorbitan monolaurate (non-ionic surfactant, HLB value=16.7)
Sodium dodecylbenzenesulfonate Hard-type (anionic surfactant)
Sodium dodecylbenzenesulfonate Soft-type (anionic surfactant)

TABLE 1

| | | Example 1 | Example 2 | Example 3 |
|---|---|---|---|---|
| CNT Dispersion Composition | Carbon Nanotube | FH-P 40 mg | FH-P 40 mg | FH-P 40 mg |
| | Surfactant | Sodium dodecylsulfate 120 mg | Sodium dodecylsulfate 120 mg | Sodium dodecylsulfate 120 mg |
| | Solvent | Water 9840 mg | Water 9840 mg | Water 9840 mg |
| Dispersion Process | Stirring Condition | 700 rpm/2 hrs | 700 rpm/2 hrs | 700 rpm/2 hrs |
| | Ultrasound Condition | Stirring Apparatus A/ 5 min | Stirring Apparatus A/ 5 min | Stirring Apparatus A/ 5 min |
| Condensing Liquid | Condensing Liquid | N,N-Dimethylacetamide | N,N-Dimethylacetamide | N,N-Dimethylacetamide |
| Immersion Condition | Water Immersion | 1 day | 2 hours | 3 days |
| | Electric Conductivity (S/cm) | 1276 | 1252 | 765 |

TABLE 2

| | | Example 4 | Example 5 | Example 6 |
|---|---|---|---|---|
| CNT Dispersion Composition | Carbon Nanotube | FH-P 40 mg | FH-P 40 mg | FH-P 40 mg |
| | Surfactant | Sodium dodecylsulfate 120 mg | Sodium dodecylsulfate 120 mg | Sodium dodecylsulfate 120 mg |
| | Solvent | Water 9840 mg | Water 9840 mg | Water 9840 mg |
| Dispersion Process | Stirring Condition | 700 rpm/2 hrs | 700 rpm/2 hrs | 700 rpm/2 hrs |
| | Ultrasound Condition | Stirring Apparatus A/ 10 min | Stirring Apparatus A/ 10 min | Stirring Apparatus A/ 10 min |
| Condensing Liquid | Condensing Liquid | N,N-Dimethylacetamide | N,N-Dimethylacetamide | N,N-Dimethylacetamide |
| Immersion Condition | Water Immersion | 1 day | 2 hours | 3 days |
| | Electric Conductivity (S/cm) | 350 | 261 | 524 |

TABLE 3

|  |  | Example 7 | Example 8 | Example 9 | Example 10 |
|---|---|---|---|---|---|
| CNT Dispersion Composition | Carbon Nanotube | FH-P 40 mg | FH-P 40 mg | FH-P 40 mg | FH-P 40 mg |
|  | Surfactant | Sodium dodecylsulfate 120 mg | Sodium dodecylsulfate 120 mg | Sodium dodecylsulfate 120 mg | Sodium dodecylsulfate 120 mg |
|  | Solvent | Water 9840 mg | Water 9840 mg | Water 9840 mg | Water 9840 mg |
| Dispersion Process | Stirring Condition | Stirring Apparatus B/ 1480 rpm, 1 hr, interval 3 sec | Stirring Apparatus B/ 1480 rpm, 1 hr, interval 3 sec | Stirring Apparatus B/ 1480 rpm, 1 hr, interval 3 sec | Stirring Apparatus B/ 1480 rpm, 1 hr, interval 3 sec |
|  | Ultrasound Condition | Stirring Apparatus A/ 5 min | Stirring Apparatus A/ 3 min | Stirring Apparatus A/ 5 min | Stirring Apparatus A/ 5 min |
| Condensing Liquid | Condensing Liquid | N,N-Dimethylacetamide | N,N-Dimethylacetamide | N,N-Dimethylacetamide | N,N-Dimethylacetamide |
| Immersion Condition | Water Immersion | 1 day | 1 day | 2 hours | 3 days |
|  | Electric Conductivity (S/cm) | 764 | 601 | 854 | 633 |

TABLE 4

|  |  | Example 11 | Example 12 | Example 13 | Example 14 |
|---|---|---|---|---|---|
| CNT Dispersion Composition | Carbon Nanotube | FH-P 20 mg | FH-P 20 mg | FH-P 30 mg | FH-P 30 mg |
|  | Surfactant | Sodium dodecylsulfate 120 mg | Sodium dodecylsulfate 120 mg | Sodium dodecylsulfate 120 mg | Sodium dodecylsulfate 120 mg |
|  | Solvent | Water 9860 mg | Water 9860 mg | Water 9850 mg | Water 9850 mg |
| Dispersion Process | Stirring Condition | 700 rpm/2 hrs | 700 rpm/2 hrs | 700 rpm/2 hrs | 700 rpm/2 hrs |
|  | Ultrasound Condition | Stirring Apparatus C/ Output 100%, on-off 1 (sec)-1 (sec), 10 min | Stirring Apparatus C/ Output 100%, on-off 1 (sec)-1 (sec), 15 min | Stirring Apparatus C/ Output 100%, on-off 1 (sec)-1 (sec), 10 min | Stirring Apparatus C/ Output 100%, on-off 1 (sec)-1 (sec), 15 min |
| Condensing Liquid | Condensing Liquid | N,N-Dimethylacetamide | N,N-Dimethylacetamide | N,N-Dimethylacetamide | N,N-Dimethylacetamide |
| Immersion Condition | Water Immersion | 1 day | 1 day | 1 day | 1 day |
|  | Electric Conductivity (S/cm) | 461 | 477 | 458 | 677 |

TABLE 5

|  |  | Example 15 | Example 16 | Example 17 |
|---|---|---|---|---|
| CNT Dispersion Composition | Carbon Nanotube | FH-P 30 mg | FH-P 30 mg | FH-P 30 mg |
|  | Surfactant | Sodium dodecylsulfate 60 mg | Sodium dodecylsulfate 60 mg | Sodium dodecylsulfate 90 mg |
|  | Solvent | Water 9910 mg | Water 9910 mg | Water 9880 mg |
| Dispersion Process | Stirring Condition | 700 rpm/2 hrs | 700 rpm/2 hrs | 700 rpm/2 hrs |
|  | Ultrasound Condition | Stirring Apparatus C/ Output 100%, on-off 1 (sec)-1 (sec), 15 min | Stirring Apparatus C/ Output 100%, on-off 1 (sec)-1 (sec), 20 min | Stirring Apparatus C/ Output 100%, on-off 1 (sec)-1 (sec), 15 min |
| Condensing Liquid | Condensing Liquid | N,N-Dimethylacetamide | N,N-Dimethylacetamide | N,N-Dimethylacetamide |
| Immersion Condition | Water Immersion | 1 day | 1 day | 1 day |
|  | Electric Conductivity (S/cm) | 345 | 895 | 735 |

TABLE 6

|  |  | Example 18 | Example 19 | Example 20 |
|---|---|---|---|---|
| CNT Dispersion Composition | Carbon Nanotube | SN2102/40 mg SG-SWNTs/5 mg | SN2102/40 mg SG-SWNTs/5 mg | Hipco-CNT/40 mg SG-SWNTs/5 mg |
|  | Surfactant | Sodium dodecylsulfate 120 mg | Sodium dodecylsulfate 120 mg | Sodium dodecylsulfate 120 mg |
|  | Solvent | Water 9835 mg | Water 9835 mg | Water 9835 mg |
| Dispersion Process | Stirring Condition | 700 rpm/2 hrs | 700 rpm/2 hrs | 700 rpm/2 hrs |
|  | Ultrasound Condition | Stirring Apparatus A/ 5 min | Stirring Apparatus A/ 10 min | Stirring Apparatus A/ 10 min |

TABLE 6-continued

|  |  | Example 18 | Example 19 | Example 20 |
|---|---|---|---|---|
| Condensing Liquid Immersion Condition | Condensing Liquid | N,N-Dimethylacetamide | N,N-Dimethylacetamide | N,N-Dimethylacetamide |
|  | Water Immersion | 1 day | 1 day | 1 day |
| Electric Conductivity (S/cm) |  | 263 | 405 | 111 |

TABLE 7

|  |  | Example 21 | Example 22 | Example 23 |
|---|---|---|---|---|
| CNT Dispersion Composition | Carbon Nanotube | FH-P 40 mg | FH-P 40 mg | FH-P 40 mg |
|  | Surfactant | Sodium dodecylsulfate 120 mg | Sodium dodecylsulfate 120 mg | Sodium dodecylsulfate 120 mg |
|  | Solvent | Water/8856 mg Formamide/984 mg | Water/8856 mg Ethylene glycol/984 mg | Water/8856 mg Dimethylsulfoxide/984 mg |
| Dispersion Process | Stirring Condition | 700 rpm/2 hrs | 700 rpm/2 hrs | 700 rpm/2 hrs |
|  | Ultrasound Condition | Stirring Apparatus A/ 10 min | Stirring Apparatus A/ 20 min | Stirring Apparatus A/ 15 min |
| Condensing Liquid Immersion Condition | Condensing Liquid | N,N-Dimethylacetamide | N,N-Dimethylacetamide | N,N-Dimethylacetamide |
|  | Water Immersion | 1 day | 1 day | 1 day |
| Electric Conductivity (S/cm) |  | 264 | 417 | 576 |

TABLE 8

|  |  | Example 24 | Example 25 | Example 26 |
|---|---|---|---|---|
| CNT Dispersion Composition | Carbon Nanotube | FH-P 20 mg | FH-P 20 mg | FH-P 20 mg |
|  | Surfactant | Triton X-100 60 mg | Triton X-100 60 mg | Triton X-100 60 mg |
|  | Solvent | Water 4940 mg | Water 4940 mg | Water 4940 mg |
| Dispersion Process | Stirring Condition | 700 rpm/2 hrs | 700 rpm/2 hrs | 700 rpm/2 hrs |
|  | Ultrasound Condition | Stirring Apparatus A/ 10 min | Stirring Apparatus A/ 10 min | Stirring Apparatus A/ 10 min |
| Condensing Liquid Immersion Condition | Condensing Liquid | N,N-Dimethylacetamide | Ethanol | N-Methylformamide |
|  | Water Immersion | 1 day | 1 day | 1 day |
| Electric Conductivity (S/cm) |  | 134 | 180 | 160 |

TABLE 9

|  |  | Example 27 | Example 28 | Example 29 |
|---|---|---|---|---|
| CNT Dispersion Composition | Carbon Nanotube | FH-P 20 mg | FH-P 20 mg | FH-P 20 mg |
|  | Surfactant | Tween20 60 mg | Tween20 60 mg | Tween20 60 mg |
|  | Solvent | Water 4920 mg | Water 4920 mg | Water 4920 mg |
| Dispersion Process | Stirring Condition | 700 rpm/2 hrs | 700 rpm/2 hrs | 700 rpm/2 hrs |
|  | Ultrasound Condition | Stirring Apparatus A/ 10 min | Stirring Apparatus A/ 10 min | Stirring Apparatus A/ 10 min |
| Condensing Liquid Immersion Condition | Condensing Liquid | N,N-Dimethylacetamide | Ethanol | N,N-Dimethylacetamide |
|  | Water Immersion | 1 day | 1 day | 1 day |
| Electric Conductivity (S/cm) |  | 125 | 141 | 160 |

TABLE 10

|  |  | Example 30 | Example 31 | Example 32 | Example 33 | Example 34 |
|---|---|---|---|---|---|---|
| CNT Dispersion | Carbon Nanotube | FH-P 20 mg | FH-P 20 mg | FH-P 20 mg | FH-P 20 mg | FH-P 20 mg |

TABLE 10-continued

|  |  | Example 30 | Example 31 | Example 32 | Example 33 | Example 34 |
|---|---|---|---|---|---|---|
| Composition | Surfactant | Sodium dodecylbenzene sulfonate (hard-type) 60 mg | Sodium dodecylbenzene sulfonate (hard-type) 60 mg | Sodium dodecylbenzene sulfonate (soft-type) 60 mg | Sodium dodecylbenzene sulfonate (soft-type) 60 mg | Sodium dodecylbenzene sulfonate (soft-type) 60 mg |
|  | Solvent | Water 4920 mg | Water 4920 mg | Water 4920 mg | Water 4920 mg | Water 4920 mg |
| Dispersion Process | Stirring Condition | 700 rpm/2 hrs | 700 rpm/2 hrs | 700 rpm/2 hrs | 700 rpm/2 hrs | 700 rpm/2 hrs |
|  | Ultrasound Condition | Stirring Apparatus A/ 15 min | Stirring Apparatus A/ 15 min | Stirring Apparatus A/ 15 min | Stirring Apparatus A/ 15 min | Stirring Apparatus A/ 15 min |
| Condensing Liquid Immersion Condition | Condensing Liquid | N,N-Dimethylacetamide | N-Methylformamide | N,N-Dimethylacetamide | Ethanol | N-Methylformamide |
|  | Water Immersion | 1 day | 1 day | 1 day | 1 day | 1 day |
| Electric Conductivity (S/cm) |  | 169 | 211 | 92 | 158 | 377 |

TABLE 11

|  |  | Example 35 | Example 36 | Example 37 | Example 38 | Example 39 |
|---|---|---|---|---|---|---|
| CNT Dispersion Composition | Carbon Nanotube | FH-P 40 mg | FH-P 40 mg | FH-P 40 mg | FH-P 40 mg | FH-P 40 mg |
|  | Surfactant | Sodium dodecylsulfate 120 mg | Sodium octylsulfate/ Sodium dodecylsulfate 90 mg/30 mg | Sodium octylsulfate/ Sodium dodecylsulfate 60 mg/60 mg | Sodium dodecylsulfate 90 mg | Sodium octylsulfate/ Sodium dodecylsulfate 45 mg/45 mg |
|  | Solvent | Water 9840 mg | Water 9840 mg | Water 9840 mg | Water 9870 mg | Water 9870 mg |
| Dispersion Process | Stirring Condition | Stirring Apparatus B/ 1480 rpm, 20 min, no interval | Stirring Apparatus B/ 1480 rpm, 20 min, no interval | Stirring Apparatus B/ 1480 rpm, 20 min, no interval | Stirring Apparatus B/ 1480 rpm, 20 min, no interval | Stirring Apparatus B/ 1480 rpm, 20 min, no interval |
|  | Ultrasound Condition | Stirring Apparatus A/ 1 min | Stirring Apparatus A/ 1 min | Stirring Apparatus A/ 1 min | Stirring Apparatus A/ 1 min | Stirring Apparatus A/ 1 min |
| Condensing Liquid Immersion Condition | Condensing Liquid | N,N-Dimethylacetamide | N,N-Dimethylacetamide | N,N-Dimethylacetamide | N,N-Dimethylacetamide | N,N-Dimethylacetamide |
|  | Water Immersion | 1 day | 1 day | 1 day | 1 day | 7 days |
| Electric Conductivity (S/cm) |  | 795 | 775 | 1058 | 612 | 720 |

TABLE 12

|  |  | Compartitive Example 1 | Example 40 | Compartitive Example 2 | Example 41 | Example 42 |
|---|---|---|---|---|---|---|
| CNT Dispersion Composition | Carbon Nanotube | FH-P 40 mg | FH-P 40 mg | FH-P 40 mg | FH-P 40 mg | FH-P 40 mg |
|  | Surfactant | Sodium hexadecyl sulfate 120 mg | Sodium hexadecyl sulfate 120 mg | Sodium octadecyl sulfate 120 mg | Sodium octadecyl sulfate 120 mg | Sodium octadecyl sulfate 120 mg |
|  | Solvent | Water 9840 mg | Water 9840 mg | Water 9840 mg | Water 9840 mg | Water 9840 mg |
| Dispersion Process | Stirring Condition | 700 rpm/2 hrs room temperature | 700 rpm/2 hrs 70° C. | 700 rpm/2 hrs room temperature | 700 rpm/2 hrs 70° C. | 700 rpm/2 hrs 70° C. |
|  | Ultrasound Condition | Stirring Apparatus A/ 3 min | Stirring Apparatus A/ 3 min | Stirring Apparatus A/ 1 min | Stirring Apparatus A/ 1 min | Stirring Apparatus A/ 1 min |
| Condensing Liquid Immersion Condition | Condensing Liquid | N,N-Dimethylacetamide | N,N-Dimethylacetamide | N,N-Dimethylacetamide | N,N-Dimethylacetamide | N,N-Dimethylacetamide |
|  | Water Immersion | 1 day | 1 day | 1 day | 1 day | 7 days |
| Electric Conductivity (S/cm) |  | No Thread Obtained | 843 | No Thread Obtained | 1057 | 1568 |

TABLE 13

|  |  | Example 43 | Compartitive Example 3 | Compartitive Example 4 | Compartitive Example 5 | Compartitive Example 6 |
|---|---|---|---|---|---|---|
| CNT Dispersion Composition | Carbon Nanotube | FH-P 40 mg | FH-P 40 mg | FH-P 40 mg | FH-P 40 mg | FH-P 40 mg |
|  | Surfactant | Sodium octadecyl sulfate 60 mg | Sodium hexadecyl sulfate 60 mg | Sodium dodecylsulfate 60 mg | Sodium octylsulfate 120 mg | Sodium octylsulfate 60 mg |

TABLE 13-continued

| | | Example 43 | Compartitive Example 3 | Compartitive Example 4 | Compartitive Example 5 | Compartitive Example 6 |
|---|---|---|---|---|---|---|
| | Solvent | Water<br>9900 mg | Water<br>9840 mg | Water<br>9840 mg | Water<br>9840 mg | Water<br>9840 mg |
| Dispersion Process | Stirring Condition | 700 rpm/2 hrs<br>70° C. | 700 rpm/2 hrs<br>70° C. | 700 rpm/2 hrs<br>room temperature | Stirring Apparatus B/<br>1480 rpm, 20 min,<br>no interval | Stirrring Apparatus B<br>1480 rpm, 20 min,<br>no interval |
| | Ultrasound Condition | Stirring Apparatus A/<br>2 min | Stirring Apparatus A/<br>3 min | Stirring Apparatus A/<br>5 min | Stirring Apparatus A/<br>1 min | Stirring Apparatus A/<br>1 min |
| Condensing Liquid Immersion Condition | Condensing Liquid<br>Water Immersion | N,N-Dimethylacetamide<br>1 day | N,N-Dimethylacetamide<br>1 day | N,N-Dimethylacetamide<br>1 day | N,N-Dimethylacetamide<br>1 day | N,N-Dimethylacetamide<br>1 day |
| | Electric Conductivity (S/cm) | 1691 | No Thread Obtained | No Thread Obtained | No Thread Obtained | No Thread Obtained |

As mentioned above, even when conditions such as water immersion time, ultrasound conditions, stirring conditions, carbon nanotube content, type of carbon nanotube, ultrasonic dispersion time, dispersion solvent (first solvent), type of surfactant, and type of condensing liquid (second solvent) were changed, the aggregated thread structure of each Example showed an electric conductivity of 50 S/cm or more.

Comparative Example 7

As Comparative Example 7, the aggregated thread structure was prepared by the method of Example 1, with the condensing liquid changed to a 1 wt % solution of polyvinyl alcohol (Fluka, MW49000).

When thermogravimetric analysis was conducted for the aggregated thread structure of Comparative Example 7 as with Example 1, the weight reduction rate was 65.7% from 100° C. to 450° C. Even when the type of carbon nanotube used was changed, the rate was not reduced to 50% or less. The G/D ratio of the Raman spectrum for the aggregated thread structure of Comparative Example 7 was 8.37.

As described above, since the aggregated thread structure of Comparative Example 7 contains resin, compared with the aggregated thread structure of Example 1, its weight reduction rate from 100° C. to 450° C. was large.

Description of Notations
1 Dispersion
3 Carbon nanotube
5 Surfactant
7 First solvent
9 Second solvent (dispersion)
11 Aggregated thread structure

The invention claimed is:

1. A method for producing an aggregated thread structure, the method comprising:
 (a) dispersing carbon nanotubes to a first solvent, which is water or a mixed solvent containing organic solvent and water, with a surfactant, to create a dispersion; and
 (b) injecting said dispersion of carbon nanotubes into a condensing liquid, which is a second solvent differing from the first solvent, to thereby aggregate and spin the carbon nanotubes;
 wherein said condensing liquid is a solution consisting essentially of one of N-methyl pyrrolidone, N,N-dimethyl acetamide, propylene carbonate, formamide, N-methyl formamide, methanol, ethanol, or propanol, and said condensing liquid and said first solvent differ in their affinity to said surfactant, and
 the pH of said condensing liquid is 3 to 11.

2. The method for producing an aggregated thread structure according to claim 1, wherein said surfactant is a surfactant selected from one or more type(s) selected from the following groups (1) to (3):
 (1) a non-ionic surfactant with an HLB, calculated by the Griffin method, of 8 or more;
 (2) an anionic surfactant: alkyl benzene sulfonate, alkyl alcohol sulfate salt, sodium alkyl diphenyl ether disulphonate, sodium polyoxyethylene alkyl ether sulfate, sodium diakyl sulfosuccinate, sodium alkyl aryl sulfosuccinate, n-lauroyl sarcosine sodium salt, sodium polyoxyethylene alkyl phenyl ether sulfate, sodium (meta) acryloyl polyoxyalkylene sulfate, alkyl alcohol phosphate;
 (3) a cationic surfactant: tetra alkyl ammonium halide.

3. The method for producing an aggregated thread structure according to claim 2, wherein said surfactant is a combination of one or more surfactants selected from each of said group (1) and said group (2), or each of said group (1) and said group (3).

4. The method for producing an aggregated thread structure according to claim 2, wherein said surfactant comprises a plurality of surfactants with different lengths of main chain.

5. The method for producing an aggregated thread structure according to claim 2, wherein said surfactant comprises sodium dodecyl sulfate.

6. The method for producing an aggregated thread structure according to claim 1, which further comprises:
 a process of extracting said aggregated thread structure from said condensing liquid and immersing in a solvent;
 a process of drying said aggregated thread structure; and
 a process of stretching said aggregated thread structure; following said process (b).

7. The method for producing an aggregated thread structure according to claim 6, which further comprises a process of twisting said aggregated thread structure.

8. The method for producing an aggregated thread structure according to claim 1, wherein said carbon nanotubes are treated for catalyst removal.

* * * * *